United States Patent
Zardi et al.

(10) Patent No.: US 6,827,887 B2
(45) Date of Patent: Dec. 7, 2004

(54) METHOD FOR OBTAINING UREA PRILLS

(75) Inventors: Federico Zardi, Breganzona (CH); Domenico Romiti, Lugano (CH)

(73) Assignee: Urea Casale S.A., Lugano-Besso (CH)

(*) Notice: Subject to any disclaimer, the term of this patent is extended or adjusted under 35 U.S.C. 154(b) by 0 days.

(21) Appl. No.: 09/987,078

(22) Filed: Nov. 13, 2001

(65) Prior Publication Data

US 2002/0056931 A1 May 16, 2002

(30) Foreign Application Priority Data

Nov. 14, 2000 (EP) .............................................. 00124819

(51) Int. Cl.⁷ .............................................. B29B 9/10
(52) U.S. Cl. ........................................... 264/13; 425/6
(58) Field of Search ................................ 264/13; 425/6

(56) References Cited

U.S. PATENT DOCUMENTS

| | | |
|---|---|---|
| 3,607,993 A | 9/1971 | Tuttle |
| 4,190,622 A | 2/1980 | Landis |
| 4,231,227 A | 11/1980 | Stewart et al. |
| 4,233,676 A | 11/1980 | Lucke et al. |
| 4,313,745 A  * | 2/1982 | Lovelace et al. ............ 65/21.4 |

FOREIGN PATENT DOCUMENTS

GB           1459781           12/1976

* cited by examiner

*Primary Examiner*—Mary Lynn Theisen
(74) *Attorney, Agent, or Firm*—Sughrue Mion, PLLC

(57) ABSTRACT

A method for obtaining urea prills in a prilling tower (1) comprising the step of making a plurality of melt urea droplets to fall from a urea melt distributing device (4) towards an urea prills collecting bottom (6) of the prilling tower, further comprises the step of cooling the collecting bottom (6).

7 Claims, 3 Drawing Sheets

METHOD FOR OBTAINING UREA PRILLS

FIELD OF APPLICATION

The present invention relates to a method for obtaining urea prills.

More in particular, the invention relates to a method for obtaining urea prills by cooling urea melt droplets in a prilling tower of a urea plant. In accordance to a further aspect, the invention concerns a prilling tower for obtaining urea prills according to the above method.

PRIOR ART

A prilling tower for producing urea prills generally comprises a vertical tubular wall, which defines an inner chamber for cooling urea melt droplets. In an upper part of the chamber a urea melt distributing device is supported. The device distributes downward, all over the tower cross section, melt urea at high temperature in the form of droplets, which fall along urea falling paths inside the chamber.

The falling urea melt droplets are then solidified and cooled down by contact with air flowing upwardly in the chamber, counter currently to the urea droplets. The cooling transforms the urea melt droplets in solid urea prills.

The urea prills thus obtained are collected in a collecting bottom comprised in a lower part of the aforesaid chamber and extracted from the prilling tower by conventional means such as conveyer belts. In particular, on such bottom a rotating scraper is generally present in order to convey the prills through an opening in the bottom on the conveyer belt located underneath the bottom.

As well known, a very important parameter to produce good quality urea prills, i.e. properly cooled and solidified prills, in a modern urea plant is to set the proper residence time within the prilling tower.

The "residence time" is defined as the time period required by a melt urea droplet to cover the distance from the distributing device to the collecting bottom, where the urea droplet is collected in the form of a solid urea prill.

The bigger is said distance, the longer will be the residence time during which the cooling occurs and consequently the cooler and thus the harder and more mechanically resistant will be the urea prills falling on the collecting bottom, given a predetermined air flowrate and air temperature.

The tower wall, made by concrete or other building materials, has a relevant height to provide the aforementioned desired distance.

In this respect it should be noted that among the equipment and units of a plant for the production of urea such as reaction, decomposition and condensation units the prilling tower represents the most extensive one.

This is because of the aforesaid relevant height required to obtain the necessary residence time for the urea melt droplets at high temperature to be cooled down.

However, in the field of urea prilling towers the need is increasingly felt of keeping their height as low as possible to reduce construction complexity, investment and maintenance costs as well as to increase the tower reliability. This means that the residence time should be reduced as much as possible without negatively effecting the cooling degree in order to guarantee satisfactory solid urea prills.

To this aim, few options are available according to the prior art as will be apparent in the forthcoming description.

Such options are also generally applied in case the production capacity of a pre-existing urea plant has to be increased and thus a greater amount of urea heat has to be removed from the prilling tower in order to maintain an appropriate cooling of the urea melt droplets.

A first option is to increase the air flowrate within the tower to enhance the droplets cooling. There is, however, a limitation to such increase because a too high flowrate could lift the urea droplets upwards causing a carry over of such droplets in the chamber. In addition, this option is often technically nor possible or very difficult to be carried out.

A second option is to chill the air flowing through the tower prior to entering the tower.

The cooling equipment required to cool the air flow is however a refrigerator system working on large air-volumes with a high-energy consumption that requires high investments and maintenance costs in addition to the tower costs.

A third option is to cool the urea prills at the tower bottom or outside the tower by means of a fluid bed cooler.

To obtain this cooling it is required a fluidising air flow, for instance at the tower bottom, having a pressure high enough to fluidise the prills suspended in a fluid bed and with a temperature low enough to cool the prills.

This involves an air booster compressor and an appropriate refrigerator system for said fluidising air flow, with ensuing high investment costs and energy consumption.

To overcome the above drawbacks a fourth option proposes the use of a cooling device outside the tower in fluid communication with the collecting bottom and downstream thereof.

Said cooling device, made by parallel disposed cooling plates internally fed with a cooling fluid, is crossed by the urea prills that are further cooled down by the contact with the external cold surface.

This device requires less energy and less capital investments then the cooling equipment previously described.

However, some additional equipment are still required to bring the prills from the tower collecting bottom to the cooler, to lift the prills to the cooler entrance and to screen the prills, which render the cooling device technically complex to manufacture and costly.

It follows that in the prior art no effective solution has been proposed in the aforesaid field of application, to enhance the urea prills cooling efficiency in a very simple, reliable and cost effective way, notwithstanding the even increasingly felt need of minimizing the height of new prilling towers or to increase the cooling efficiency of existing towers after a production increase while reducing or maintaining unaltered the tower height.

SUMMARY OF THE INVENTION

The technical problem underlying the present invention is to provide a method for obtaining urea prills in a prilling tower with improved cooling efficiency of the urea melt droplets which is simple to carry out, reliable and does not require high investment and operating costs.

The problem is solved according to the present invention by a method for obtaining urea prills in a prilling tower, comprising the step of:

making a plurality of melt urea droplets to fall from a urea melt distributing device towards an urea prills collecting bottom of the prilling tower;

characterized by the fact of further comprising the step of:

cooling said collecting bottom.

According to a further aspect thereof, the present invention makes available a prilling tower for obtaining urea prills comprising a melt urea distributing device and an urea prills collecting bottom characterised by the fact of further comprising:

means for cooling the collecting bottom.

Thanks to the present invention, the cooling of the urea prills is advantageously substantially increased in an easy and reliable way.

In fact, cooling of the urea prills falling on the collecting bottom can be effectively and satisfactorily completed directly on the latter. This advantageously allows to manufacture prilling towers of reduced height, i.e. with a residence time of the falling urea melt droplets far from the optimal one, and to increase the production capacity of an existing tower without the need of increasing its height.

Moreover, the present invention can be easily applied to both new or existing prilling towers without requiring particular structural changes in the tower itself as well as high investment and operating costs.

The features and advantages of the invention will be clear from the following indicative and non-limiting description of an embodiment of the invention, made with reference to the attached drawings.

DETAILED DESCRIPTION OF THE DRAWING

Figure 1:
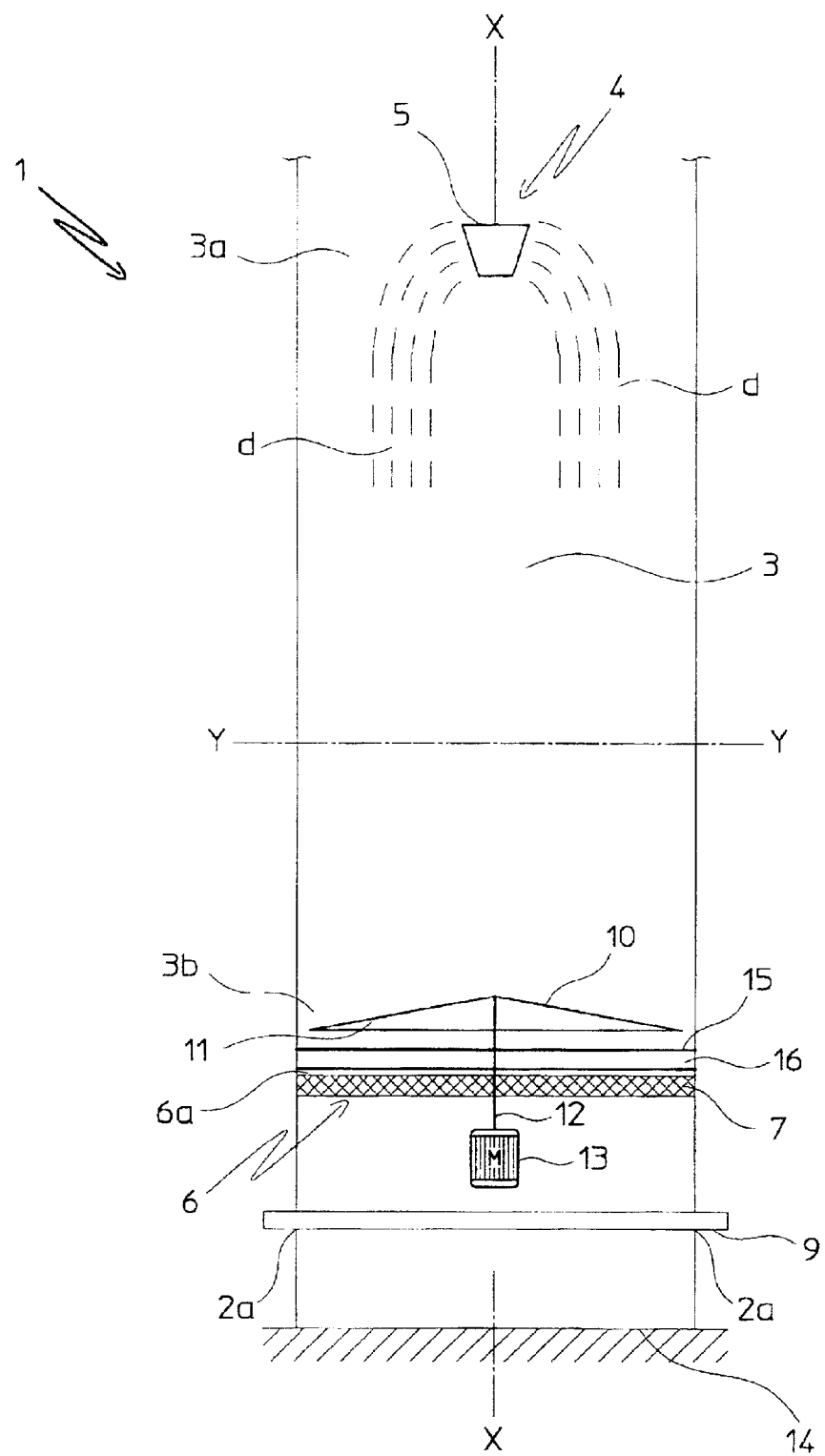
FIG. 1 shows a longitudinal section of a prilling tower according to the present invention.
Figure 2:
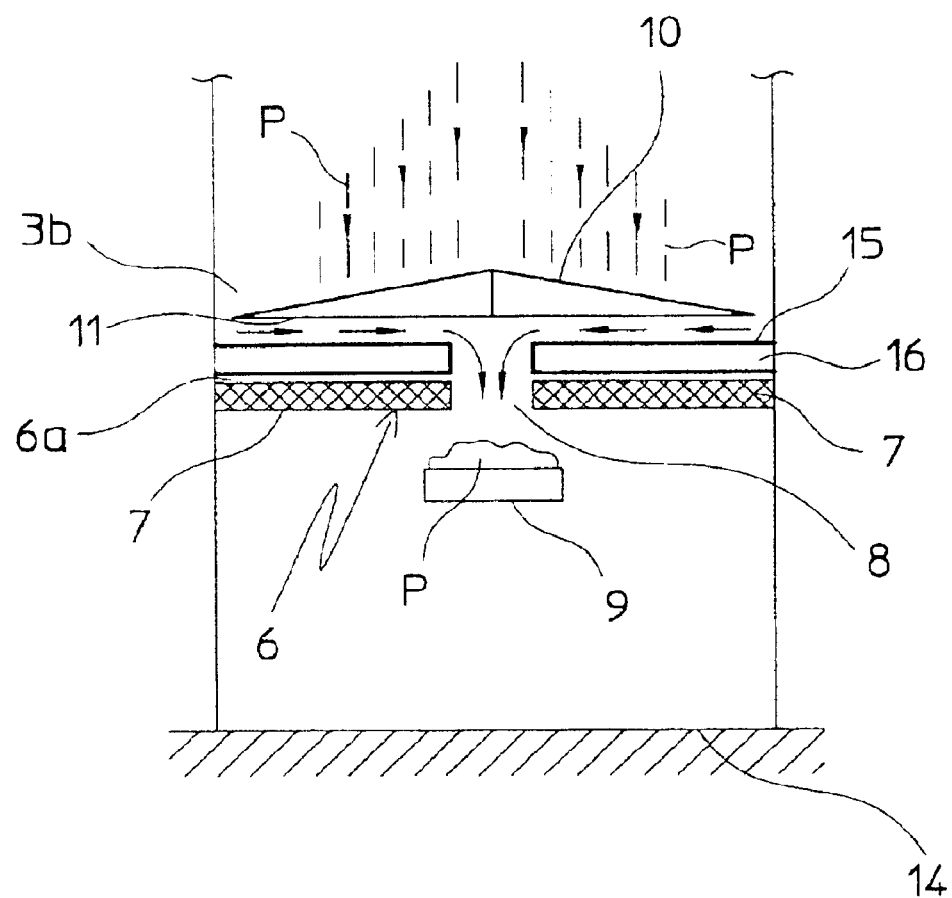
FIG. 2 shows a longitudinal section of a particular of the prilling tower according to FIG. 1 taken along line x—x.
Figure 3:
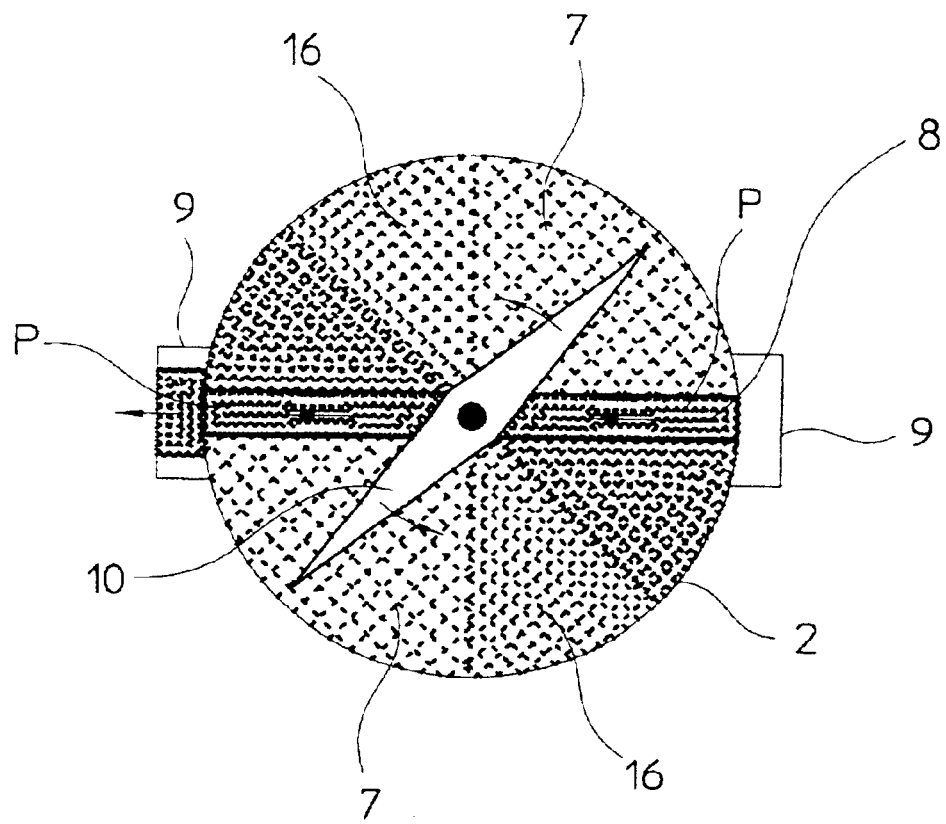
FIG. 3 shows a top view of a cross section of the prilling tower according to FIG. 1 taken along line y—y.

With reference to FIGS. 1–3, a prilling tower 1 is shown comprising a tubular vertical wall 2, preferably of cylindrical shape, which defines an inner chamber 3 for cooling urea melt droplets generally indicated with "d" in FIG. 1.

A urea melt distributing device 4 is placed at an upper end 3a of the chamber 3. The distributing device 4 is fixed to the wall 2 and connected to a urea melt inlet pipe by conventional means (not shown).

The distributing device 4 generally comprises a perforated basket 5 that rotates at constant speed around its vertical central axis, or one or more static sprayers and is in fluid communication with said urea melt inlet pipe, not shown.

In the example of FIG. 1, the wall 2 and thus the chamber 3 are open at the top. However, conventional covers and/or roofs may be provided on the tower top in order to let the cooling air out but, at the same time, protect the internal chamber 3 from the environment.

A urea prills collecting bottom 6 is arranged at a lower end 3b of said chamber 3. The collecting bottom 6 is substantially perpendicular to the wall 2 and has a diameter substantially equivalent to the inner diameter of the prilling tower 1.

As clearly shown in FIGS. 2 and 3, the collecting bottom 6 is divided in two substantially equal half-circular portions, both indicated by reference 7. Portions 7 are separated to each other by a longitudinal slot 8, extended along a diameter of the bottom 6.

Underneath the collecting bottom 6 and parallel to the slot 8 is arranged a conveyer belt 9, slightly wider than the slot 8, for extracting the obtained urea prills, generally indicated with "p" in FIGS. 2 and 3, from the prilling tower 1.

As can be seen in FIG. 1, the conveyer belt 9 is longer than the diameter of the tubular wall 2, which is thus provided with openings 2a for the arrangement of the bell 9 throughout the prilling tower 1.

On the collection bottom 6 is arranged a rotating scraper 10 for extracting the urea prills from such bottom and directing them towards the slot 8 on the conveyer belt 9.

The scraper 10 comprises a blade 11 rotating around the tower central axis in proximity of the collecting bottom 6 and driven by a motor 13 arranged below the bottom 6 and connected to the scraper 10 by means of shaft 12. For simplicity reasons, motor 13 and shaft 12 have been omitted from FIG. 2.

The wall 2 is conventionally fixed at its bottom to the ground, schematically indicated with 14 in the figures.

According to the present invention, the prilling tower 1 advantageously further comprises means 15 for cooling the collecting bottom 6.

Preferably, such cooling means 15 are provided above the collecting bottom 6, between an upper surface 6a thereof and the scraper blade 11.

In the present example, such cooling means 15 comprise two hollow half-circular elements, both indicated by reference 16, completely covering the two bottom portions 7, respectively. The hollow elements are preferably flat and allow the passage within the same of a cooling fluid (not shown) in heat exchange relationship with the collecting bottom 6.

In accordance to a further embodiment, elements 16 define at their internal a zig-zag or coil shaped flow path for the cooling fluid. To this aim the hollow elements 16 are provided with vertical walls or baffles (not shown), which separate the internal hollow space of the elements 16 according to the flow path that is intended to obtain.

In alternative to the hollow elements 16, the cooling means 15 may comprise one or more coils or zig-zag shaped pipes (not shown) for the passage of the cooling fluid.

The cooling means 15 such as the elements 16 are opportunely connected with conventional means (such as ducts) for the inlet to and the outlet from the same of the cooling fluid. For simplicity reasons such connecting means are not shown in the figures.

Moreover, according to still further embodiments of the present invention, not shown, the cooling means 15, can also be arranged immediately below the collecting bottom 6 or within the same.

In addition, the prilling tower 1 can also comprise means (not shown) such as coils for cooling the rotating scraper 10, thus advantageously enhancing the cooling and hardening of the urea prills falling on the collecting bottom 6.

In the following of the description, the present method for obtaining urea prills is described more in details.

A flow of urea melt obtained in a finishing section (not shown) of a urea plant is conventionally fed to the distributing device 4 of the prilling tower 1 arranged at the upper end 3a of the cooling chamber 3.

The rotating basket 5 of the distributing device 4 generates a plurality of urea melt droplets d which are made to fall (by gravity) downward within the chamber 3 towards the prills collecting bottom 6 of the prilling tower 1.

The time required to the melt urea droplets to fall from the distributing device 4 along their respective falling paths on the collecting bottom 6 and more in particular on the upper surface of the hollow elements 16 of the cooling means 15, is the time in which the melt urea droplets are transformed into solid urea prills p. As seen above this time is the so called residence time.

During their fall towards the collecting bottom 6, the urea melt droplets d are put into contact with an air flow at room temperature (not shown) flowing upwardly in the chamber 3 in counter-current to the urea and thus are cooled down and solidify to urea prills.

Advantageously, according to the invention, the present method for obtaining urea prills further comprises the step of cooling the collecting bottom 6.

So doing the cooling and hardening of the urea prills can be drastically improved and completed independently from the tower height or the tower production capacity. It is, therefore, possible to design a new prilling tower with a lower height or increase the capacity of an existing prilling tower without affecting the desired prills quality.

In fact, the prills obtained during the fall of the urea melt droplets within the chamber 6 are collected on the constantly cooled hollow elements 16 placed above the collecting bottom 6. Here they are further cooled by direct contact with the cooled surface of the elements 16 (i.e. by indirect heat exchange with the cooling fluid flowing within the elements 16).

Once collected on the bottom 6, the urea prills are than extracted from the prilling tower 1 by means of the rotating scraper 10, which pushes the prills towards the central slot 8, and the conveyer belt 9.

Thanks to the present invention, the large surface area of the collecting bottom 6 is advantageously exploited to sensibly enhance the urea prills cooling.

Moreover, the cooling step according to the invention is also very effective since it is carried out in a part of the prilling tower, the collecting bottom 6, where the urea prills lay a certain, not negligible, period of time before leaving the same trough the slot 9. The present invention thus advantageously makes use of this laying period to further cool of the urea prills.

Advantageously, the action of the rotating scrapers 10 during the laying period of the urea prills on the bottom 6 allows a mixing of the prills enhancing an uniform cooling the same and thus to obtain an homogeneous product. The scraper 10 also ensures that all the surface area of the collecting bottom can be used for the cooling of the urea prills.

Compared to the methods of the prior art, the step of cooling the urea prills collecting bottom is simple and reliable to carried out and does not require high investments and operating costs as well as high energy consumption.

Furthermore, the present invention is particularly suitable to be applied in pre-exiting prilling towers since it makes available an improved cooling efficiency without requiring particular structural changes on the tower itself, thus allowing to increase the production capacity and at the same time maintaining unaltered or even reducing the urea resident time within the tower.

What is claimed is:

1. Method for obtaining urea prills in a prilling tower (1), comprising the step of:

making a plurality of melt urea droplets to fall from a urea melt distributing device (4) towards an urea prills collecting bottom (6) of said prilling tower;

characterized by the fact of further comprising the step of:

cooling said collecting bottom (6) such that cooling of so obtained urea prills takes place directly on said collecting bottom by means of the bottom itself.

2. Method for obtaining urea prills in a prilling tower (1), comprising the step of:

making a plurality of melt urea droplets to fall from a urea melt distributing device (4) towards an urea prills collecting bottom (6) of said prilling tower in counter-current with an upwardly flowing air flow;

characterised by the fact of further comprising the step of:

cooling said collecting bottom (6) such that cooling of so obtained urea prills takes place directly on said collecting bottom by means of the bottom itself.

3. Prilling tower (1) for obtaining urea prills comprising a melt urea distributing device (4) and an urea prills collecting bottom (6) characterised by the fact of further comprising:

means (15) for cooling said collecting bottom (6) such that cooling of so obtained urea prills takes place directly on said collecting bottom by means of the bottom itself.

4. Prilling tower according to claim 3, characterized by the fact that said cooling means (15) comprise at least an hollow element (16) placed above said collecting bottom (6) for the passage within said element (16) of a cooling fluid in heat exchange relationship with said collecting bottom (6).

5. Prilling tower (1) for obtaining urea prills comprising a tubular vertical wall (2), which defines an inner chamber (3) for cooling urea melt droplets, a urea melt distributing device (4) arranged at an upper end (3a) of said chamber (3), a urea prills collecting bottom (6) arranged at a lower end (3b) of said chamber (3) and a rotating scraper (10) on said collecting bottom (6) for extracting the urea prills from the prilling tower;

characterized by the fact of further comprising:

means (15) for cooling said collecting bottom (6) such that cooling of so obtained urea prills takes place directly on said collecting bottom by means of the bottom itself.

6. Prilling tower according to claim 5, characterized by the fact that said cooling means (15) comprise at least an hollow element (16) placed above said collecting bottom (6) for the passage within said element (16) of a cooling fluid in heat exchange relationship with said collecting bottom (6).

7. Prilling tower according to claim 5, characterized by the fact of further comprising means for cooling said rotating scraper (10).

* * * * *